United States Patent [19]

Whitted, III

[11] 4,330,918
[45] May 25, 1982

[54] HYDROSTATIC PIPE SPLICING APPARATUS

[75] Inventor: Hugh E. Whitted, III, East Bend, N.C.

[73] Assignee: Akzona Incorporated, Asheville, N.C.

[21] Appl. No.: 213,817

[22] Filed: Dec. 8, 1980

Related U.S. Application Data

[62] Division of Ser. No. 24,761, Mar. 28, 1979, abandoned.

[51] Int. Cl.³ .............................................. B23P 19/04
[52] U.S. Cl. ...................................... 29/237; 29/254; 72/56
[58] Field of Search ................. 29/421 E, 516, 421 R, 29/237, 459, 254, 255; 72/56, 60, 54; 285/382, 382.1, 382.7

[56] References Cited

U.S. PATENT DOCUMENTS

| | | | |
|---|---|---|---|
| 2,995,053 | 8/1961 | Freedom | 72/430 |
| 3,341,650 | 9/1967 | Broske | 29/421 E X |
| 3,434,194 | 3/1969 | Whittaker et al. | 29/421 E |
| 3,555,866 | 1/1971 | Roth | 72/56 |
| 3,605,777 | 9/1971 | Curry et al. | 29/421 E X |
| 3,759,551 | 9/1973 | Broske | 29/421 E X |

FOREIGN PATENT DOCUMENTS

| | | | |
|---|---|---|---|
| 2253351 | 5/1973 | Fed. Rep. of Germany | 72/56 |
| 2231515 | 1/1974 | Fed. Rep. of Germany | 72/56 |

*Primary Examiner*—Charlie T. Moon
*Attorney, Agent, or Firm*—Francis W. Young; David M. Carter

[57] ABSTRACT

A method and apparatus for containing an annular body of fluid about a sleeve spanning the abutting ends of pipe lengths, and firing a charge of propellant, such as fast burning smokeless powder, in the liquid so as to radially shrink the sleeve into sealing engagement with the pipe lengths. If desired, the pipe lengths can be internally supported to avoid the possibility of collapse. Hard annular elements may be interposed between the sleeve and the pipe length ends to produce better mechanical locking.

4 Claims, 4 Drawing Figures

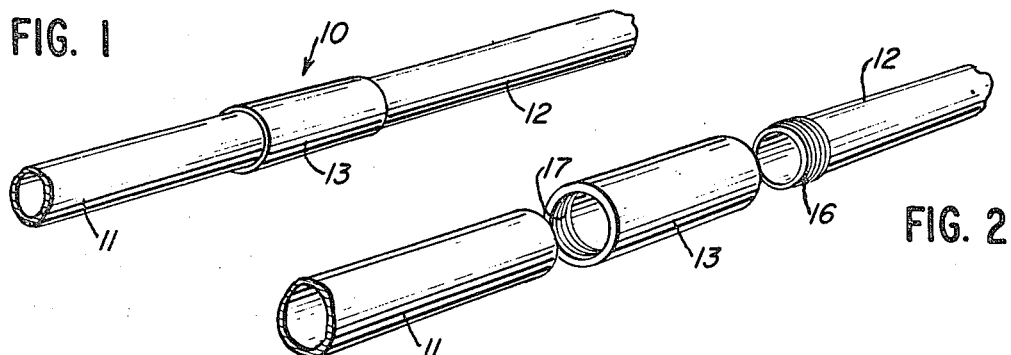
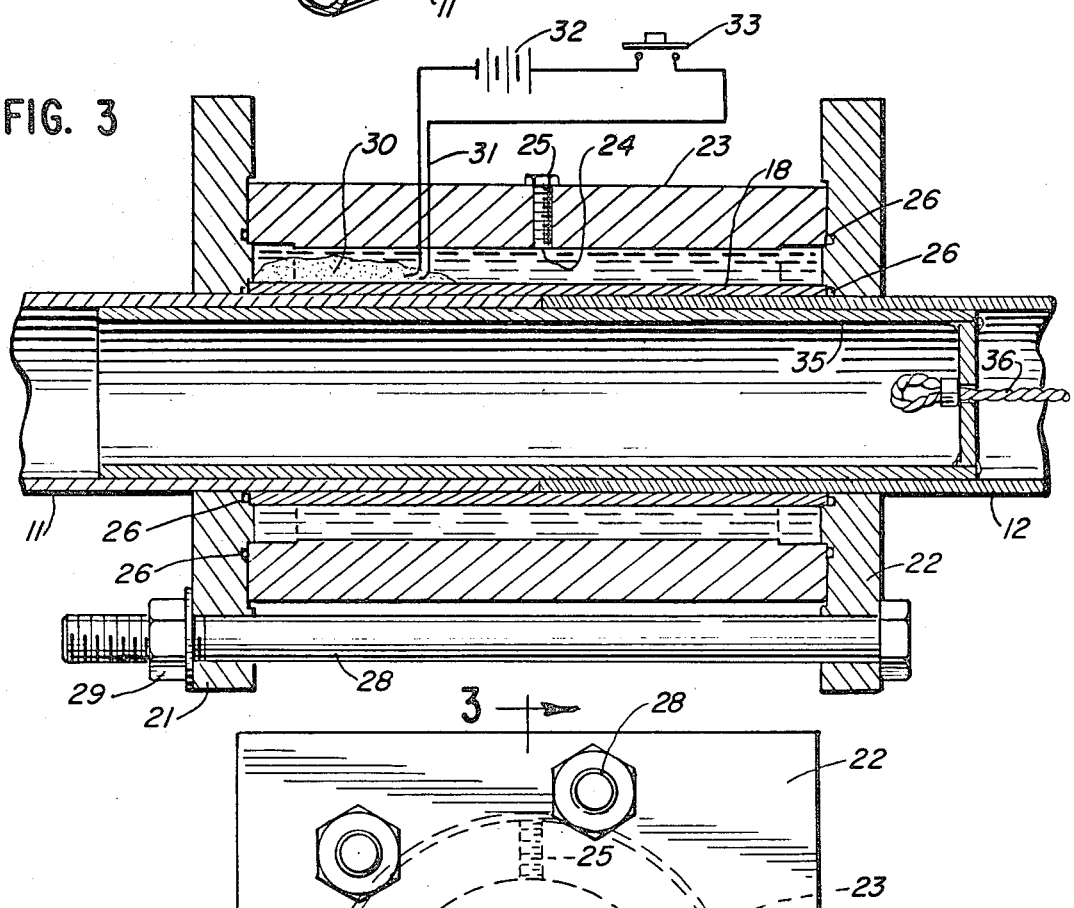
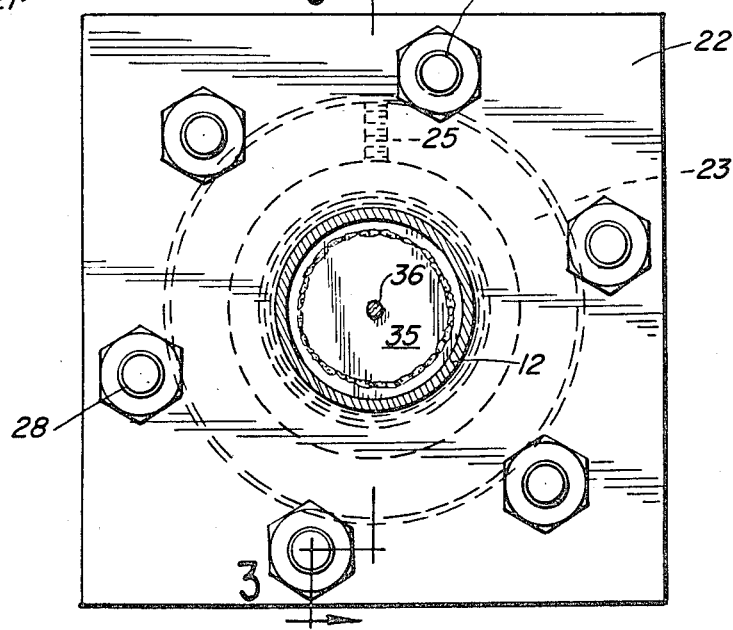

HYDROSTATIC PIPE SPLICING APPARATUS

This is a division of application Ser. No. 24,761, filed Mar. 28, 1979, now abandoned.

This invention relates generally to joining lengths of pipe and more particularly concerns a method and apparatus for hydrostatically forming a sleeve into a pipe splice.

A pipe line is conventionally formed by butt welding the ends of sections of pipe. For example, a gas transmission pipe line may be formed of approximately 40 foot lengths of extruded aluminum pipe 4" in diameter and having ¼" thick walls. Adjacent pipe lengths are carefully welded to form gas tight joints. Such welds are difficult and expensive to make at best, and inherently the welded areas become somewhat annealed, creating weak spots in the resulting pipe line.

There is a body of patent art suggesting the forming of pipe or tube connections by explosively driving a sleeve into intimate contact with adjacent ends of the lengths of the pipe or tube. U.S. Pat. Nos. Re. 26,685, 3,366,334, 3,495,778, 3,742,582, 3,759,551, 3,872,707 and 3,876,233 represent aspects of this work. However, to applicant's knowledge, these or similar techniques have not been used commercially for pipe splicing, probably because of a number of technical problems flowing from the general approach of explosively driving a cold forming member to produce the desired connection.

Accordingly, it is the primary aim of this invention to eliminate expensive, time-consuming welding for the making of gas tight pipe splices by providing a novel sleeve splice that avoids many of the problems of the prior art.

It is an object of the invention to provide such a splice which allows the pipe to be spliced in end abutting contact, thus avoiding internal pipe discontinuities, and which requires no critical dimensioning preparation of the splicing sleeve. A related object is to provide a splice as characterized above that does not depend on critical tolerances between the pipe and the splicing apparatus since the splicing force is exerted hydrostatically. It is another object to provide such a splice in which the splicing force is created by firing a charge of powder, but which does not require critical placement of the charge.

Another object is to provide a splice of the above type that results from a process that can be repeated if it is thought desirable. A further object is to provide a splicing process of the foregoing character that can be performed under water on pipe that has been cut for access or is otherwise already substantially in place.

Other objects and advantages of the invention will become apparent upon reading the following detailed description and upon reference to the drawings, in which:

FIG. 1 is a fragmentary perspective of a splice embodying the present invention;

FIG. 2 is an exploded perspective of the parts appearing in FIG. 1 before the splice is made;

FIG. 3 is a longitudinal section of the apparatus used for making the splice illustrated in FIG. 1; and FIG. 4 is an end view of the structure appearing in FIG. 3.

While the invention will be described in connection with a preferred embodiment, it will be understood that I do not intend to limit the invention to that embodiment. On the contrary, I intend to cover all alternatives, modifications and equivalents as may be included within the spirit and scope of the invention as defined by the appended claims.

Turning to the drawing, there is shown in FIG. 1 a splice 10 embodying the invention in which two pipe lengths 11 and 12 are brought into end abutting relationship and a sleeve 13, bridging the abutting ends of the pipe lengths 11, 12, is radially shrunk into sealing engagement with the pipe lengths. Preferably, substantially annular members such as ordinary piano wire can be wrapped around the pipe length end as at 16, or fitted within the sleeve as at 17, before the ends of the pipe lengths 11, 12 are slipped into the sleeve 13. Thus, when the sleeve 13 is radially shrunk into place, the annular members at 16, 17 are embedded in the materials of the sleeve and pipe length ends to provide a mechanical lock against linear displacement.

In accordance with the invention, the splice 10 is made by slipping the sleeve 13 over the ends of adjacent pipe lengths, confining an annular body of liquid, preferably water, about the sleeve 13, and firing a charge of propellant in the liquid so as to radially shrink the sleeve. In the illustrated embodiment, the annular body of water is confined between a pair of end plates 21 and 22 that closely surround the pipe lengths 11, 12 and abut the ends of the sleeve 13, and a cylindrical body 23 sealed between the end plates 21, 22 so as to define a cavity between the end plates 21, 22, the sleeve 13 and the body 23. A tapped hole 24, which can be substantially water sealed by a screw 25, permits the cavity to be filled with water. Preferably, simple resilient liquid sealing members 26 are fitted between the end plates 21, 22 and the sleeve 13 and the body 23.

The end plates 21, 22 and cylindrical body 23 assembly is readily secured together by a plurality of bolts 28 and nuts 29. A package of propellant 30 is inserted in the cavity before it is sealed and filled with water, and electrical detonation leads 31 are run through a sealed hole in the body 23 to a battery 32 and a firing switch 33. The fluid may be pressurized by other methods, i.e. a pump, and either internal or external to the cavity.

To give some idea of the scales involved, good experimental results have been obtained joining 4" diameter extruded aluminum pipe (T6 alloy 6061) that is nominally ¼" thick. The sleeve, also aluminum, was fitted on the pipe length ends with about 1/16" to ¼" clearance. A propellant charge of approximately 300 to 500 grains of Bullseye™ smokeless pistol powder, packed in a waterproof bag, was utilized. Igniting the charge resulted in shrinking the sleeve into gas tight sealing engagement with the pipe length ends.

For guarding against internal collapse of the pipe lengths, a mandrel 35 slightly longer than the sleeve 13 may be slid into the pipe lengths 11, 12 for supporting the inside walls of the pipe lengths when the propellant is discharged. A cable 36 fixed to one end of the mandrel 35 permits the mandrel to be forcibly withdrawn after the splice is made.

The firing of the propellant 30 directly in the body of virtually incompressible liquid develops tremendous force on the sleeve 13 which, being the weakest element containing the liquid, deforms into the desired configuration. This is plainly different from the use of an explosive created gas pressure, acting through a liquid, for forming metal as in U.S. Pat. No. 2,995,053.

It can now be seen that a splice 10 has been provided which allows the pipe to be spliced in end abutting contact, thus avoiding internal pipe discontinuities which can cause vortexes in the material being transmitted through the pipe or hang-up points for mechanical "pigs" used to clean or test the pipe. Since the splicing force is exerted hydrostatically, there are no critical mechanical tolerances to be maintained. The placement of the charge 30 is also not critical since its actuation anywhere in the body of liquid produces an instantaneous and uniform shrinking force on the sleeve.

It will be appreciated that the splice 10 can be formed under water if desired on pipe already substantially in place. Furthermore, the operation can be repeated at a given splice location since the parts are not so distorted by a single splicing operation as to prevent a repetition of the process.

The structure illustrated and described above is intended to confirm and illustrate the principle involved. Commercial apparatus would desirably be side-opening so as to fit over a continuous length of pipe at any intermediate point.

I claim:

1. An apparatus for splicing pipe by sealing a sleeve over the ends of adjacent pipe lengths comprising, in combination, a pair of annular end plates sized to closely surround said pipe lengths and abut the ends of a sleeve fitted over the ends of adjacent pipe lengths, a cylindrical body sealed between said end plates and defining a rigid body having an annular cavity surrounding said sleeve, means for filling said cavity with liquid, and means for firing a charge of propellant in said liquid so as to radially shrink said sleeve into sealing engagement with said pipe lengths.

2. The combination of claim 1 including a cylindrical mandrel fitted within said pipe lengths for a linear length somewhat greater than the length of said sleeve so as to support the pipe lengths against radial collapse upon firing of said propellant.

3. The combination of claim 1 in which said end plates and body are releasably secured together so as to be readily assembled and readily disassembled.

4. An apparatus for splicing pipe by sealing a sleeve over the ends of adjacent pipe lengths comprising, in combination, a pair of annular end plates sized to closely surround said pipe lengths and abut the ends of a sleeve fitted over the ends of adjacent pipe lengths, a cylindrical body sealed between said end plates and defining a rigid body having an annular cavity surrounding said sleeve, means for filling said cavity with liquid, and means for firing a charge of propellant in said rigid body so as to radially shrink said sleeve into sealing engagement with said pipe lengths.

* * * * *